(12) United States Patent
Kurioka et al.

(10) Patent No.: US 10,285,328 B2
(45) Date of Patent: May 14, 2019

(54) LAWN MOWER CUTTER BLADE

(71) Applicant: HONDA MOTOR CO., LTD., Tokyo (JP)

(72) Inventors: Shunsuke Kurioka, Wako (JP); Shingo Tsuruoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/670,643

(22) Filed: Mar. 27, 2015

(65) Prior Publication Data
US 2015/0271998 A1  Oct. 1, 2015

(30) Foreign Application Priority Data
Mar. 27, 2014  (JP) .................. 2014-066529

(51) Int. Cl.
| A01D 34/73 | (2006.01) |
| A01D 34/82 | (2006.01) |
| A01D 34/68 | (2006.01) |
| A01D 101/00 | (2006.01) |

(52) U.S. Cl.
CPC .......... *A01D 34/826* (2013.01); *A01D 34/68* (2013.01); *A01D 34/73* (2013.01); *A01D 2101/00* (2013.01)

(58) Field of Classification Search
CPC .. A01D 34/826; A01D 34/73; A01D 2101/00; A01D 34/68
USPC .................................. 56/255, 295
See application file for complete search history.

(56) References Cited

U.S. PATENT DOCUMENTS

| 3,183,655 | A | * | 5/1965 | Kern | ...................... | A01D 34/73 56/255 |
| 3,220,170 | A | * | 11/1965 | Smith | .................... | A01D 34/63 56/255 |
| 3,636,685 | A | * | 1/1972 | Speckman | ............. | A01D 34/73 56/295 |
| 4,214,426 | A | * | 7/1980 | Lindblad | .............. | A01D 34/826 56/17.5 |
| 4,290,258 | A | * | 9/1981 | Gobler | ................... | A01D 34/73 56/295 |

(Continued)

FOREIGN PATENT DOCUMENTS

| DE | 2949364 A1 | * | 6/1981 | ............. | A01D 34/73 |
| DE | 3807016 A1 | * | 9/1988 | ............. | A01D 34/73 |

(Continued)

*Primary Examiner* — Thomas B Will
*Assistant Examiner* — Joan D Misa
(74) *Attorney, Agent, or Firm* — Rankin, Hill & Clark LLP (57) ABSTRACT

A lawn mower includes a cutter blade that is an elongated member extending in opposite horizontal directions with respect to a vertical rotation shaft. The cutter blade includes, on each of its longitudinally opposite end portions, a blade section formed along the front edge, in a rotating direction of the cutter blade, of the end portion, and an air lift section extending from the front edge while curving rearward and upward. The air lift section has a vertical downward wing formed integrally thereon and extending downward via a bent section that is bent downward from at least a rear half portion, in the rotating direction, of an outer peripheral edge of the air lift section. The bent section has a radius set to gradually increase as the air lift section curves rearward and upward in the rotating direction.

5 Claims, 7 Drawing Sheets

(56) References Cited

U.S. PATENT DOCUMENTS

| | | | | |
|---|---|---|---|---|
| 4,426,831 A * | 1/1984 | Klas | ............... | A01D 34/73 56/17.5 |
| D289,524 S * | 4/1987 | Andersson | ............... | D15/17 |
| 5,033,259 A * | 7/1991 | Adcock | ............... | A01D 34/73 56/255 |
| 5,199,251 A * | 4/1993 | Rouse | ............... | A01D 34/73 56/255 |
| 5,259,176 A * | 11/1993 | Kahamura | ............... | A01D 34/73 56/255 |
| 5,890,354 A * | 4/1999 | Bednar | ............... | A01D 34/005 56/255 |
| 5,894,717 A * | 4/1999 | Yamashita | ............... | A01D 34/005 56/17.5 |
| 6,301,868 B1 * | 10/2001 | Siplinger | ............... | A01D 34/73 56/255 |
| 6,360,517 B1 * | 3/2002 | Ishimori | ............... | A01D 34/71 56/255 |
| 6,415,591 B1 * | 7/2002 | Tylka, Sr. | ............... | A01D 34/73 56/255 |
| 6,487,840 B1 * | 12/2002 | Turner | ............... | A01D 34/005 56/295 |
| 6,640,449 B1 * | 11/2003 | Hoffmann | ............... | A01D 34/73 30/347 |
| 6,655,119 B2 * | 12/2003 | Hasei | ............... | A01D 34/73 56/255 |
| 7,392,643 B2 * | 7/2008 | Warashina | ............... | A01D 34/005 56/17.5 |
| D598,475 S * | 8/2009 | Roth | ............... | D15/17 |
| 7,617,664 B1 * | 11/2009 | Fitzpatrick | ............... | A01D 34/005 241/292.1 |
| D649,981 S * | 12/2011 | Roth et al. | ............... | D15/17 |
| D693,373 S * | 11/2013 | Shiotsuki | ............... | D15/17 |
| D723,589 S * | 3/2015 | Nishihara | ............... | D15/17 |
| D766,332 S * | 9/2016 | Poole | ............... | D15/17 |
| 2015/0047308 A1 * | 2/2015 | Schreiner | ............... | A01D 34/73 56/10.1 |
| 2015/0052868 A1 * | 2/2015 | Schreiner | ............... | A01D 34/66 56/17.5 |

FOREIGN PATENT DOCUMENTS

| | | | | | |
|---|---|---|---|---|---|
| DE | 102004006163 A1 * | 9/2004 | ............ | A01D 34/73 |
| EP | 0371238 A1 * | 6/1990 | ............ | A01D 34/73 |
| FR | 2695291 A1 * | 3/1994 | ............ | A01D 34/73 |
| JP | H01-121323 | 8/1989 | | |
| JP | 06046638 A * | 2/1994 | | |
| JP | 2006-067918 | 3/2006 | | |

* cited by examiner

FIG.8A (CONVENTIONAL EXAMPLE OF LOWER CUTTER BLADE)

FIG.8B (LOWER CUTTER BLADE IN EMBODIMENT)

LAWN MOWER CUTTER BLADE

FIELD OF THE INVENTION

The present invention relates to a rotary lawn mower with an improved cutter blade.

BACKGROUND OF THE INVENTION

Among the conventionally-known rotary lawn mowers are ones which cut grass by rotating a cutter blade, accommodated in a downwardly-opening housing, along the grass on a lawn. The rotation of the cutter blade would produce unwanted noise sound, and thus, improvement of cutter blades has been under way with a view to suppressing unwanted noise of the lawn mowers. One example of such lawn mowers is disclosed in Japanese Patent Application Laid-Open Publication No. 2006-67918 (hereinafter referred to as "Patent Literature 1").

The lawn mower disclosed in Patent Literature 1 includes a rotation shaft extending in a vertical (up-down) direction in a housing, and upper and lower cutter blades accommodated within the housing for rotation about the rotation shaft. The upper cutter blade has a blade section formed along the front edge, in the rotating direction, of the upper cutter blade for cutting grass on a lawn. The lower cutter blade has, on each of its longitudinally opposite end portions, a blade section formed along the front edge, in the rotating direction, of the lower cutter blade, and an air lift section extending from the front edge while curving obliquely rearward and upward for producing swirling air flows and ascending air flows. Production of unwanted noise sound can be suppressed by the air lift sections provided on the lower cutter blade.

In recent years, there has been a growing demand for more consideration or attention to environment during grass cutting operation by the lawn mower. Thus, it has been required nowadays to place more emphasis on noise suppression performance of the cutter blade.

Japanese Utility Model Application Laid-Open Publication No. H01-121323 (hereinafter referred to as "Patent Literature 2") discloses a cutter blade of a lawn mower constructed to achieve an enhanced noise suppression performance. The cutter blade disclosed in Patent Literature 2 has, on each of its longitudinally opposite end portions, an air lift section and a vertical wing. During the grass cutting operation, the vertical wing is revolvable about the rotation shaft as the cutter blade rotates and extends upward from the outer peripheral edge of the cutter blade. Such a vertical wing suppresses production of a vortex current of air to thereby suppress production of noise sound.

However, because each of the vertical wings extends upward from the outer peripheral edge of the cutter blade, grass cut during the grass cutting operation (grass clippings) may pile up on the upper surface of the cutter blade. Further, each of the vertical wings may be directly exposed to an air flow field, i.e. swirling air flows. Therefore, more improvement has to be made in order to further enhance the noise suppression performance of the lawn mower.

SUMMARY OF THE INVENTION

In view of the foregoing prior art problems, it is an object of the present invention to provide a technique that can further enhance the noise suppression performance of the cutter blade.

In order to accomplish the above-mentioned object, the present invention provides an improved lawn mower, which comprises: a rotation shaft accommodated in a downwardly-opening housing and extending vertically in the housing; and a cutter blade accommodated in the housing and rotatably mounted on the rotation shaft, the cutter blade being an elongated member extending in opposite horizontal directions with respect to the rotation shaft, the cutter blade including, on each of its longitudinally opposite end portions, a blade section formed along the front edge, in a rotating direction of the cutter blade, of the end portion, and an air lift section extending from the front edge while curving rearward and upward for producing swirling air flows and ascending air flows, the air lift section on each of the longitudinally opposite end portions of the cutter blade having a vertical downward wing formed integrally thereon, the vertical downward wing extending downward via a bent section that is bent downward from at least a rear half portion, in the rotating direction, of an outer peripheral edge of the air lift section, the vertical downward wing being formed in a vertical plate shape and extending along the outer peripheral edge of the air lift section, the bent section having a radius set to gradually increase as the air lift section curves rearward and upward in the rotating direction.

According to the present invention, each of the air lift sections has the vertical wind formed thereon in a vertical plate shape and extending downward from the outer peripheral edge of the air lift section. Thus, the present invention can minimize production of separation and vortex current of air and thereby minimize noise sound of the lawn mower due to the production of separation and vortex current of air.

Further, each of the vertical downward wings is oriented downward with respect to the air lift section, with which it is possible to prevent grass cut during the grass cutting operation (grass clippings) from piling up on the upper surface of the cutter blade. Thus, it is possible to stably achieve the effect of suppressing noise sound of the lawn mower. Besides, in the present invention, each of the vertical downward wings is less likely to be exposed to a flow field of air flowing along the upper surface of the cutter blade, i.e. swirling air flows. In this way, it is possible to minimize separation and vortex current of air produced by the vertical downward wings themselves.

Further, each of the vertical downward wings extends downward via the bent section bent downward from the outer peripheral edge of the air lift section. Thus, a fine vortex current of air produced from the wingtip can be minimized by a corner portion between the outer peripheral edge of the air lift section and an upper end portion of the vertical downward wing.

Further, the radius of each of the bent sections gradually increases as the air lift section curves rearward and upward generally in the rotating direction. Further, the blade section is provided near the front end of each of the vertical downward wings. Thus, it is preferable that the radius of a portion of the bent section corresponding to the front end of the vertical downward wing be as small as possible. With the radius of the bent section set to gradually increase as the air lift section curves rearward and upward generally in the rotating direction as noted above, the present invention can smoothly reduce separation and vortex current of air produced in a rear end portion, in the rotating direction, of the cutter blade. As a result, it is possible to smoothly minimize noise sound due to production of such separation and vortex current of air.

Furthermore, the vertical downward wings are each formed integrally on the corresponding air lift section and in a vertical plate shape and extending along the outer peripheral edge of the air lift section. Thus, the vertical downward wings can each serve as a rib reinforcing the air lift section, so that the air lift sections can have an increased bending strength.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE INVENTION

An embodiment of a lawn mower of the present invention will be described hereinbelow with reference to FIGS. 1 to 8. Note that, in the following description, the terms "left", "right", "upper", "lower" etc. are used to refer to directions as viewed from a human operator operating the lawn mower.

Figure 1:
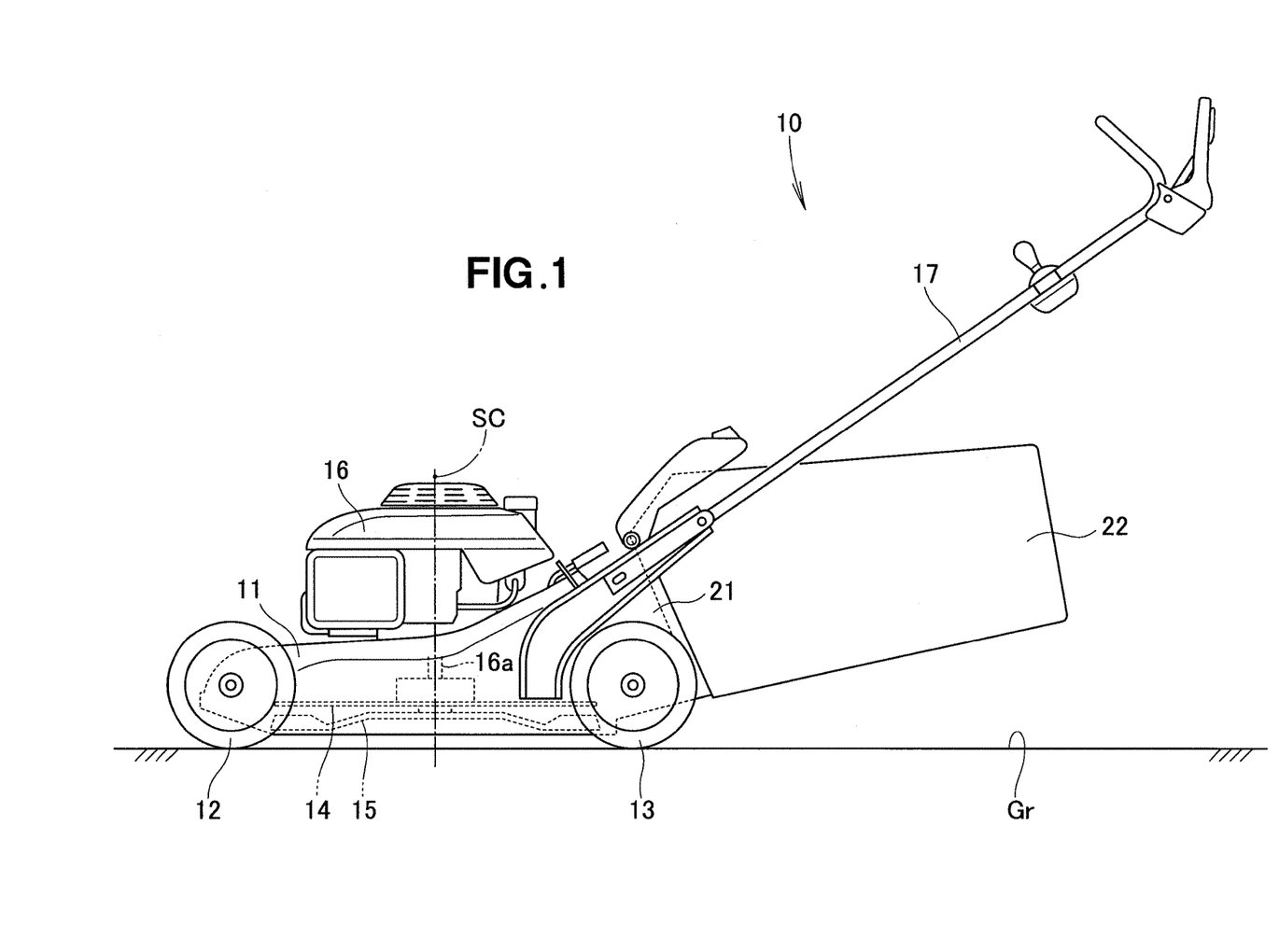
FIG. 1 is a left side view showing an embodiment of a lawn mower of the present invention.

As shown in FIG. 1, the lawn mower 10 of the present invention is a walk-behind, self-propelled working machine, which includes: a housing 11; left and right front wheels 12 provided on a front section of the housing 11; left and right rear wheels 13 provided on a rear section of the housing 11; upper and lower cutter blades 14 and 15 accommodated in a middle interior section of the housing 11; an engine (power source) 16 provided on an upper portion of the housing 11; and an operating handle 17 extending rearward from the housing 11. Note that, although the power source 16 will be described hereinbelow as being the engine, it may for example be an electric motor rather than being limited to the engine.

By rotating the upper and lower cutter blades 14 and 15 via the engine 16, the lawn mower 10 can not only cut grass but also produce flows of air (flows of swirling air or swirling air flows). By the swirling air flows, the grass cut by the upper and lower cutter blades 14 and 15, i.e. grass clippings, can be delivered to a grass clippings container 22 for storage therein.

The housing 11 is a downwardly-opening housing of which only the lower end surface (i.e., the surface opposed to a generally-horizontal lawn ground (ground surface) Gr) is substantially fully open. Further, the housing 11 is a member having a spiral shape as viewed in top plan, i.e. a scroll or spiral casing, which includes a scroll section for delivering the grass cut by the upper and lower blades 14 and 15 (i.e., grass clippings) to a grass clippings discharge passage 21 while swirling the grass clippings by the swirling air. The grass clippings container 22, e.g. in the form of a grass clippings bag, is detachably attached to the rear end of the grass clippings discharge passage 21. The grass clippings are delivered to the grass clippings discharge passage 21 while swirling around the output shaft 16a within the housing 11.

The housing 11 functions also as a machine body, and the engine 16 is assembled to the housing 11 by being superimposed and bolted to the upper surface of the housing 11. The engine 16 has the output shaft 16a extending, in a direction toward the lawn ground Gr, from the lower end of the engine 16 into the housing 11. The output shaft 16a is a rotation shaft extending vertically (in an up-down direction) within the housing 11. Consequently, the output shaft (rotation shaft) 16a extends substantially vertically to the generally-horizontal lawn ground Gr, i.e. ground surface Gr.

Within the housing 11, the upper and lower cutter blades 14 and 15 are mounted on the output shaft 16a via not-shown clutches. By being driven via the engine 16, the upper and lower cutter blades 14 and 15 can rotate about the rotation shaft 16a (shaft center SC) within the housing 11.

Figure 2A:
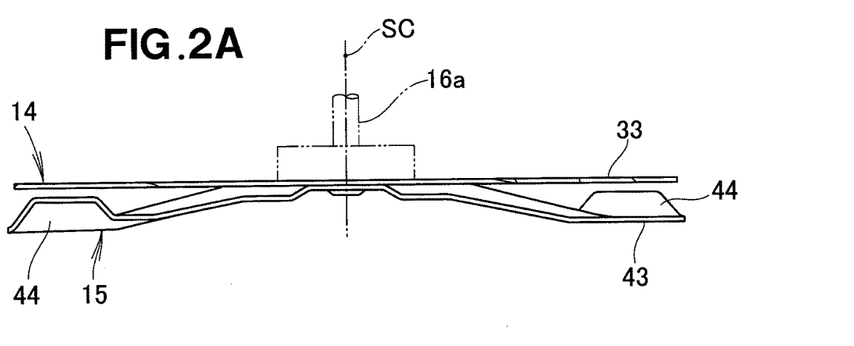
FIGS. 2A and 2B are a side view and an upper perspective view, respectively, of upper and lower cutter blades shown in FIG. 1.
Figure 2B:
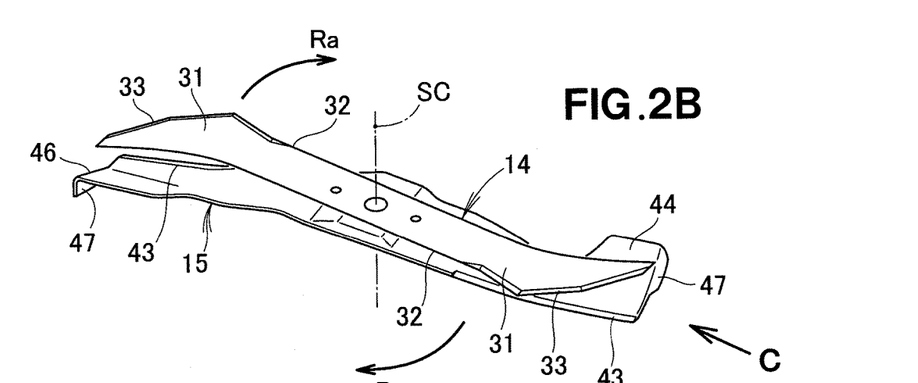

FIG. 2A is a side view of the upper and lower cutter blades 14 and 15 shown in FIG. 1, and FIG. 2B is an upper perspective view of the upper and lower cutter blades 14 and 15 shown in FIG. 2A. Further, FIG. 2C is a longitudinal end view of the upper and lower cutter blades 14 and 15 taken in a direction arrow c of FIG. 2B.

As shown in FIGS. 2A and 2B, the upper cutter blade 14 is an elongated member having a flat plate shape or band plate shape as viewed in plan and extending in opposite horizontal directions with respect to the rotation shaft 16a (shaft center SC). The upper cutter blade 14 has, on its longitudinally opposite end portions 31, two blade sections 33 each formed along the front edge 32, in a rotating direction Ra, of the upper cutter blade 14 for cutting grass.

Figure 3:
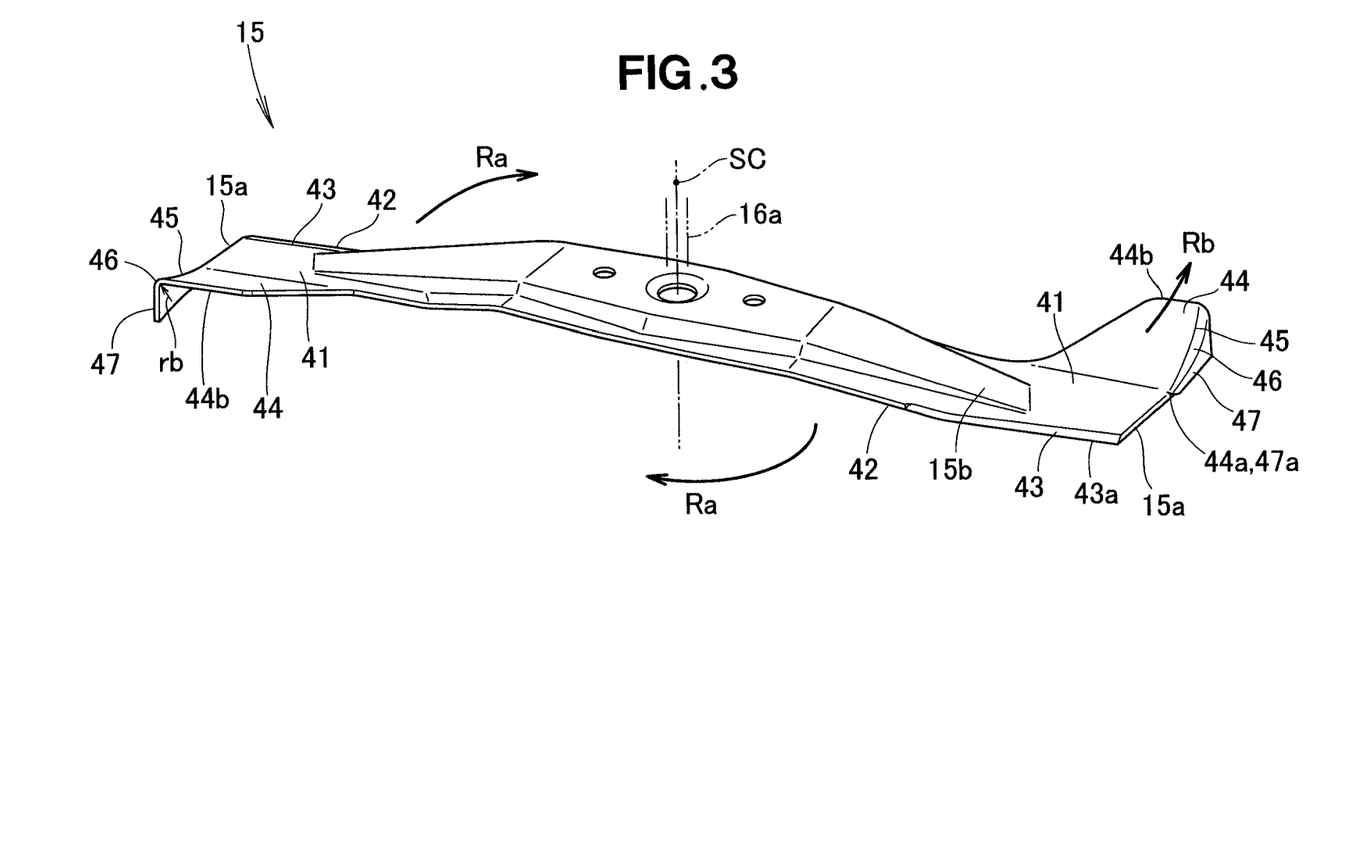
FIG. 3 is a perspective view showing the lower cutter blade of FIGS. 2A to 2C.
Figure 4:
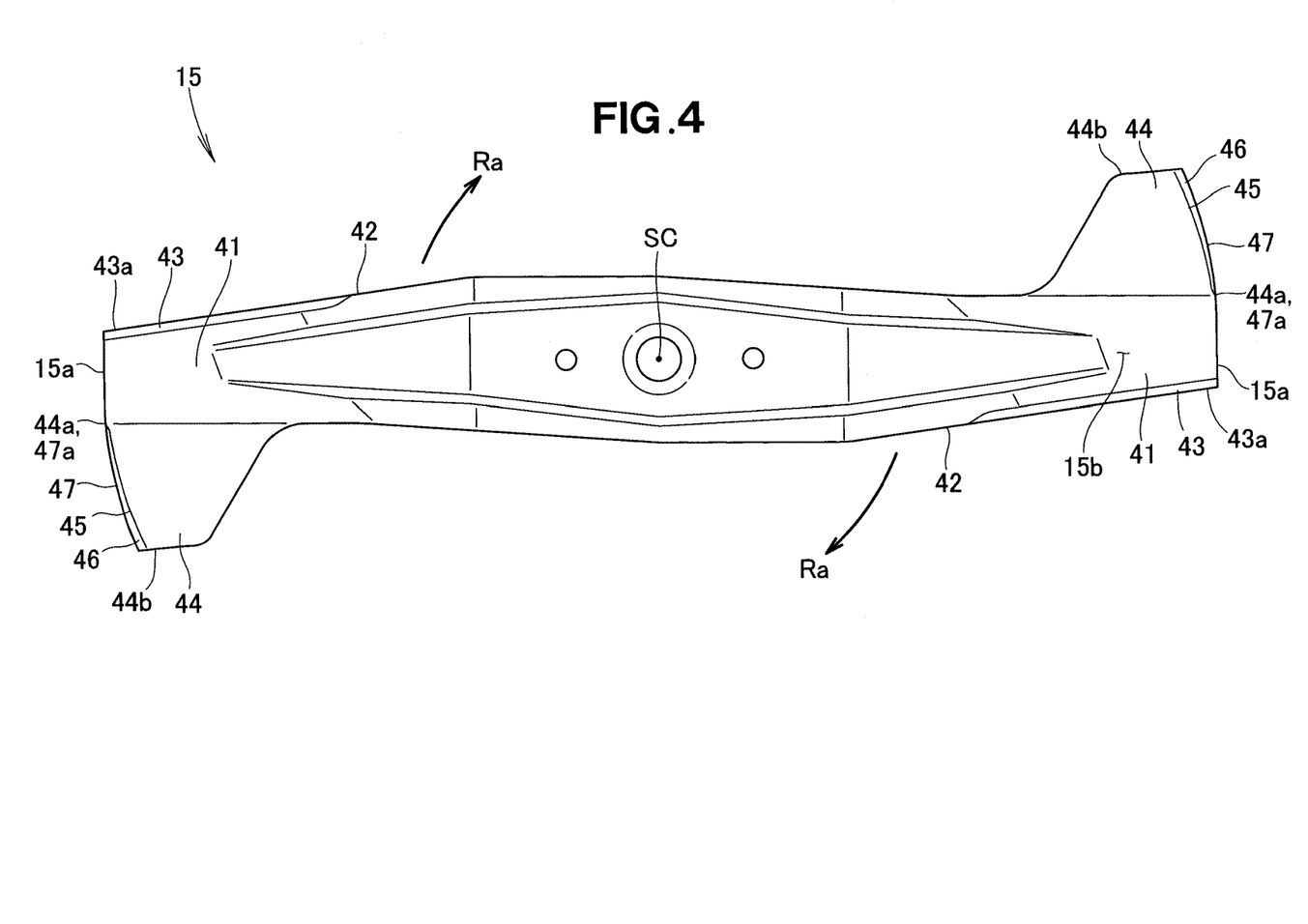
FIG. 4 is a plan view of the lower cutter blade shown in FIG. 3.
Figure 5:
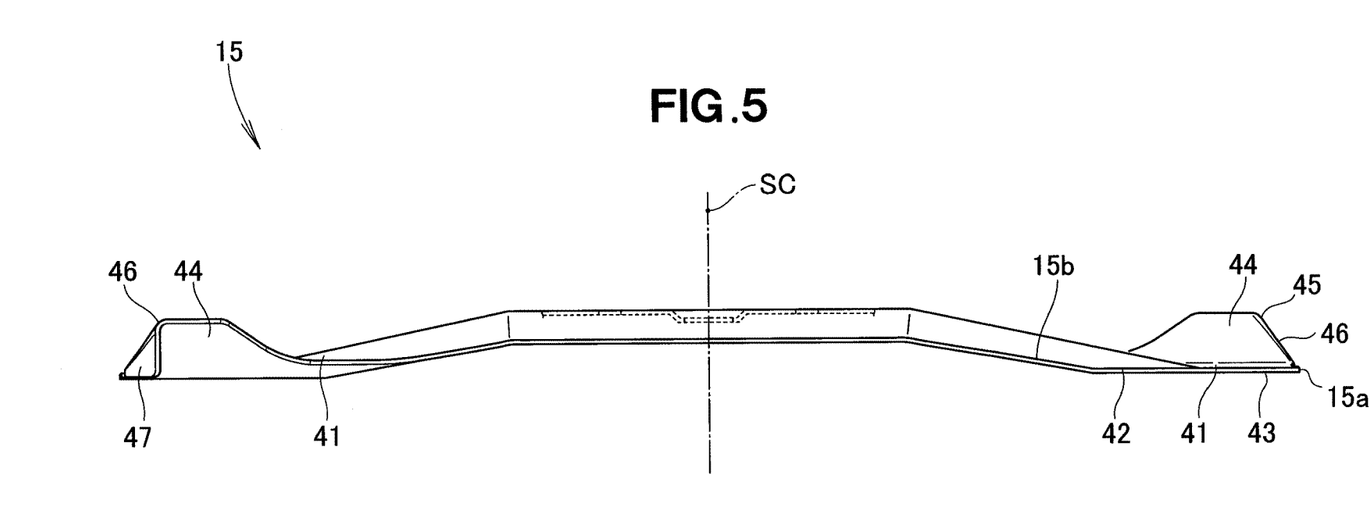
FIG. 5 is a side view of the lower cutter blade shown in FIG. 3.

As shown in FIGS. 3 to 5, the lower cutter blade 15 is an elongated member having a flat plate shape or band plate shape as viewed in plan and extending in opposite horizontal directions with respect to the rotation shaft 16a. The lower cutter blade 15 has, on its longitudinally opposite end portions 41, two blade sections 43 each formed along the front edge 42, in the rotating direction Ra, of the lower cutter blade 15 and two air lift sections 44 extending while curving rearward and upward (i.e., in a direction of arrow Rb) from the front edge 42.

Figure 2C:
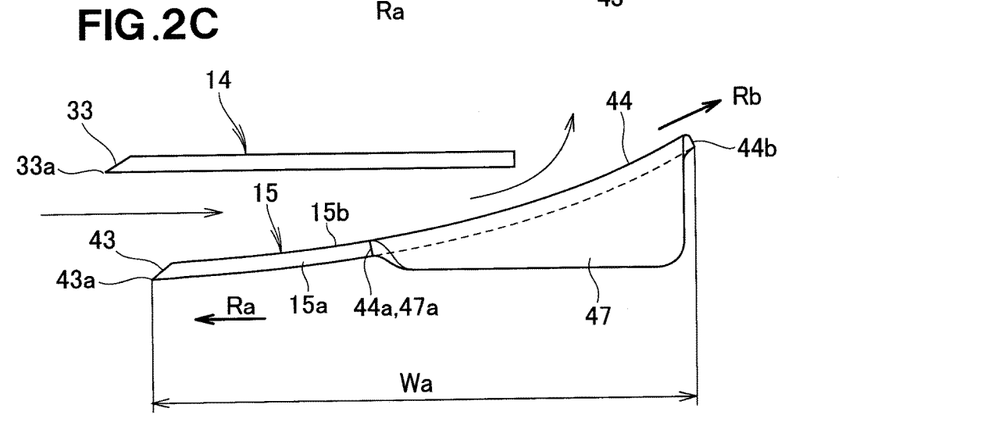
FIG. 2C is a longitudinal end view of the upper and lower cutter blades taken in a direction arrow c of FIG. 2B.

As shown in FIGS. 2B and 2C, at least a portion of a cutting edge 43a of each of the blade sections 43 of the lower cutter blade 15 is offset, in a direction opposite the rotating direction Ra, from a cutting edge 33a of a corresponding one of the blade sections 33 of the upper cutter blade 14.

Next, a detailed description will be given about the lower cutter blade 15. Hereinafter, the lower cutter blade 15 will sometimes be referred to simply as "the cutter blade 15".

As seen in FIGS. 3 to 5, each of the air lift sections 44 is a section formed integrally on the lower cutter blade 15 for producing swirling air flows and ascending air flows as the lower cutter blade 15 rotates about the rotation shaft 16a in the rotating direction Ra.

More specifically, the front end 44a of each of the air lift sections 44 is located adjacent to a corresponding one of the blade sections 43. For example, the front end 44a of each of the air lift sections 44 is located at a substantial middle of an overall width of the lower cutter blade 15 from the cutting edge 43a of the blade section 43 to the rear end 44b of the air lift section 44 (see FIG. 2C).

Further, vertical downward wings 47 are formed integrally on respective ones of the air lift sections 44. Each of the vertical downward wings 47 extends downward via (from the outer edge of) a bent section 46 that is bent obliquely downward from at least a rear half portion, in the rotating direction Ra, of the air lift section's outer peripheral edge 45 revolvable about the rotation shaft 16a as the cutter blade 15 rotates. Each of the vertical downward wing 47 is formed in a vertical plate shape and extends along the outer peripheral edge 45. The front end 47a of each of the vertical downward wings 47 is located at the front end 44a of the air lift section 44.

Figure 6:
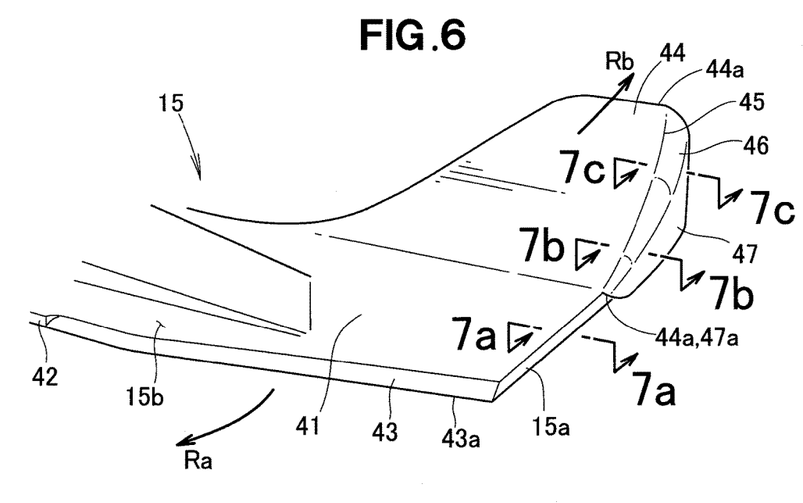
FIG. 6 is an enlarged view showing a longitudinal end portion of the lower cutter blade shown in FIG. 3.
Figure 7:
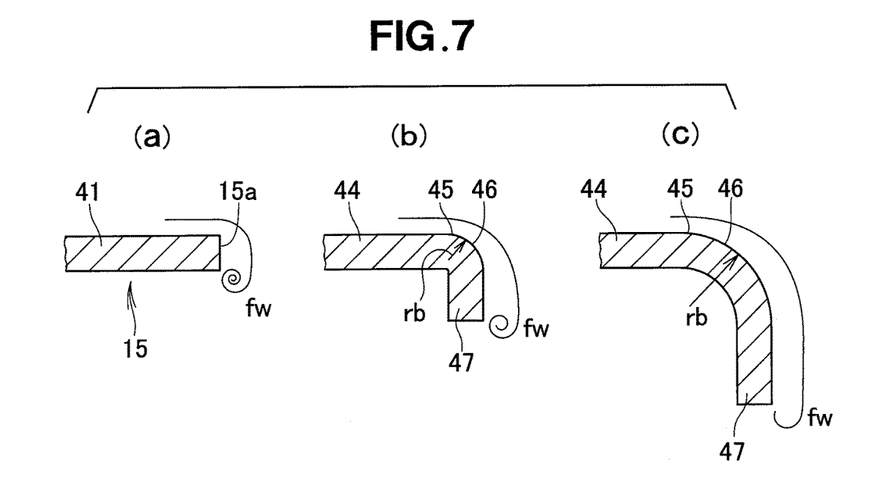
FIG. 7 is a side view of various portions of a bent section of FIG. 6.

FIG. 6 is an enlarged perspective view of one of the longitudinally opposite end portions 41 of the cutter blade 15 shown in FIG. 3. FIG. 7 is a side view of various portions of a bent section shown in FIG. 6. More specifically, (a) of FIG. 7 is a sectional view taken along the 7a-7a of FIG. 6, (b) of FIG. 7 is a sectional view taken along the 7b-7b of FIG. 6, and (c) of FIG. 7 is a sectional view taken along the 7c-7c of FIG. 6.

The bent section 46 has a radius rb set to gradually increase as the air lift section 44 curves rearward and upward generally in the rotating direction Ra. Namely, of the longitudinal end surface 15a of the cutter blade 15, a portion located more forward, in the rotating direction Ra, than the front end 47a of the vertical downward wing 47 does not have the bent section 46, as shown in FIG. 6 and (a) of FIG. 7. Further, as seen in FIG. 6 and (b) of FIG. 7, the radius rb of the bent section 46 at the front end 47a of the vertical downward wing 47 is set as small as possible. Furthermore, as shown in FIG. 6 and (c) of FIG. 7, the radius rb of the bent section 46 at a rear portion, in the rotating direction Ra, of the vertical downward wing 47 is set greater than the radius rb of the bent section 46 at a front portion of the vertical downward wing 47.

Figure 8A:
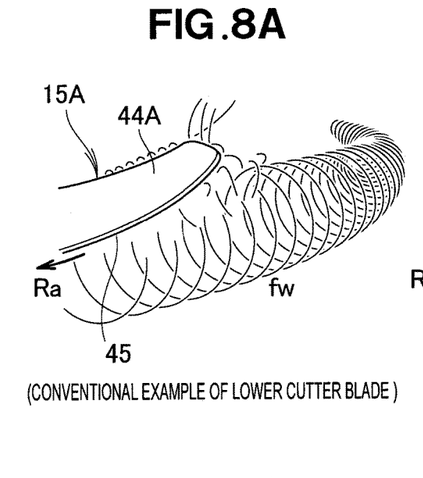
FIG. 8A is a view showing behavior of a comparative conventional example of a lower cutter blade.

The following describe operation or behavior of the cutter blade 15 constructed in the aforementioned manner. FIG. 8A shows an air lift section 44A of a comparative conventional example of a cutter blade 15A, while FIG. 8B shows the air lift section 44 of the cutter blade 15 in the embodiment of the present invention.

The air lift section 44A of the comparative conventional example of the cutter blade 15A is similar in construction to the air lift section 44 of the cutter blade 15 in the embodiment of the present invention, except in that it does not have a vertical downward wing. With no vertical downward wing, separation and vortex current fw of air can occur along the air lift section's outer peripheral edge that is revolvable about a not-shown rotation shaft.

Figure 8B:
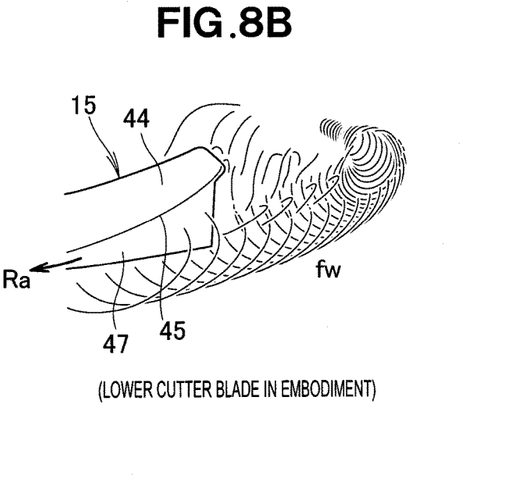
FIG. 8B is a view showing behavior of the lower cutter blade in the embodiment shown in FIG. 3.

By contrast, the air lift section 44 of the cutter blade 15 in the embodiment according to the present invention shown in FIG. 8B has the downwardly-extending vertical downward wing 47 that is formed in a vertical plate shape and extends along the outer peripheral edge 45. With such an air lift section 44 of the cutter blade 15 in the embodiment, it is possible to minimize separation and vortex current fw of air and thereby minimize noise sound of the lawn mower 10 due to the separation and vortex current of air.

Further, because each of the vertical downward wings 47 is oriented downward with respect to the air lift section 44 as shown in FIGS. 3 and 7, it is possible to prevent grass cut during the grass cutting operation (grass clippings) from piling up on the upper surface 15b of the cutter blade 15. Thus, it is possible to stably achieve the effect of suppressing noise sound of the lawn mower 10. Besides, each of the vertical downward wings 47 is less likely to be exposed to a flow field of air flowing along the upper surface 15b of the cutter blade 15, i.e. swirling air flows. In this way, it is possible to minimize separation and vortex current of air produced by the vertical downward wings 47 themselves.

Further, as shown in FIGS. 3, 6 and 7, each of the vertical downward wings 47 extends downward via the bent section 46 that is bent downward from the outer peripheral edge 45 of the air lift section 44. Thus, a fine vortex current fw of air produced from the wingtip can be minimized by a corner portion between the outer peripheral edge of the air lift section 44 and an upper end portion of the vertical downward wing 47.

More separation and vortex current of air may occur along each of the vertical downward wings 47 in higher portions of the air lift section 44; namely, the separation and vortex current of air increases gradually in a direction from the front end 44a toward the rear end 44b. Because such separation and vortex current of air can become a source of noise sound, it is preferable that the radius rb of each of the bent sections 46 be large.

However, the vertical downward wing 47 is formed, via the bent section 46, on each of the air lift sections 44 only along the rear half portion, in the rotating direction Ra, of the outer peripheral edge 45 of the air lift section 44, as shown in FIGS. 6 and 7. In other words, on each of the air lift sections 44, the blade section 43 is provided near the front end 47a of the vertical downward wing 47. Namely, of the longitudinal end surface 15a of the cutter blade 15, the portion located more forward, in the rotating direction Ra, than the front end 47a of the vertical downward wing 47 does not have the bent section 46. Thus, if the above-mentioned radius rb is large uniformly through an entire range of the vertical downward wing 47, it is not possible to suppress separation and vortex current fw of air flowing past the front end 47a of the vertical downward wing 47.

By contrast, in the instant embodiment, the radius rb of the bent section 46 at the front end 47a of the vertical downward wing 47 is set as small as possible. Thus, it is possible to reduce a variation in shape of a region of the longitudinal end surface 15a immediately forward and rearward, in the rotating direction Ra, of the front end 47a. As a consequence, generation of noise sound can be suppressed by suppressing generation of separation and vortex current fw of air flowing past the front end 47a.

Further, because the radius rb of the bent section 46 gradually increases as the air lift section 44 curves rearward and upward generally in the rotating direction Ra of the cutter blade 15, it is possible to smoothly reduce separation and vortex current fw of air produced in a rear end portion, in the rotating direction Ra, of the cutter blade 15. As a result, it is possible to smoothly minimize noise sound due to production of such separation and vortex current fw of air.

Further, as shown in FIG. 3, the vertical downward wings 47 are each formed integrally on the corresponding air lift section 44 and in a vertical plate shape and extend along the outer peripheral edge 45 of the air lift section 44.

Thus, the vertical downward wings 47 can each serve as a rib reinforcing the air lift section 44, so that the air lift sections 44 can have an increased bending strength.

The basic principles of the present invention are well suited for application to walk-behind lawn mowers.

What is claimed is:

1. A lawn mower comprising:
    a rotation shaft accommodated in a downwardly-opening housing and extending vertically in the housing; and
    a cutter blade accommodated in the housing and rotatably mounted on the rotation shaft,
    the cutter blade being an elongated member extending in opposite horizontal directions with respect to the rotation shaft, the cutter blade including longitudinally opposite end portions, each end portion extending between a front leading edge, in a rotating direction of the end portion, and an opposite trailing edge, the front leading edge and the trailing edge defining the width of the end portion,
    the cutter blade including, on each of the longitudinally opposite end portions thereof, a blade section formed along the front leading edge, and an air lift section extending from the opposite trailing edge of the end portion while curving rearward and upward relative to the trailing edge for producing swirling air flows and ascending air flows, wherein in a side view of each end portion an entirety of the end portion that includes the air lift section from the front leading edge to the opposite trailing edge curves upward and an upper surface of the air lift section extends smoothly and not at an angle from an upper surface of the end portion so that the upper surface of the air lift section and the upper surface of the entirety of the end portion that includes the air lift section together define a continuous smooth curved surface from the front leading edge to a rear end of the air lift section,
    the air lift section on each of the longitudinally opposite end portions of the cutter blade having a vertical downward wing formed integrally thereon, the vertical downward wing extending downward via a bent section that is bent downward from at least a rear half portion, in the rotating direction, of an outer peripheral edge of the air lift section,
    the vertical downward wing being formed in a vertical plate shape and extending along the outer peripheral edge of the air lift section which is curved toward the rotation shaft,
    the bent section having a radius set to gradually increase as the air lift section curves rearward and upward in the rotating direction.

2. The lawn mower of claim 1, wherein each air lift section includes a front end, in the rotating direction of the end portion, an opposite rear end, and outer peripheral edges that converge toward one another at the rear end.

3. The lawn mower of claim 2, wherein the front end of each air lift section is aligned with the trailing edge of each respective end portion.

4. The lawn mower of claim 1, wherein the cutter blade is configured as a lower cutter blade, and the lawn mower further includes an upper cutter blade accommodated in the housing and rotatably mounted on the rotation shaft.

5. The lawn mower of claim 4, wherein a distance between the upper cutter blade and the lower cutter blade gradually reduces toward an end portion of the upper cutter blade.

* * * * *